(12) United States Patent
Abdelaziz et al.

(10) Patent No.: US 7,978,631 B1
(45) Date of Patent: Jul. 12, 2011

(54) METHOD AND APPARATUS FOR ENCODING AND MAPPING OF VIRTUAL ADDRESSES FOR CLUSTERS

(75) Inventors: Mohamed M. Abdelaziz, Santa Clara, CA (US); Bernard Traversat, Menlo Park, CA (US); Shreedhar Ganapathy, Sunnyvale, CA (US); Abhijit Kumar, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1076 days.

(21) Appl. No.: 11/756,494

(22) Filed: May 31, 2007

(51) Int. Cl.
*H04L 12/28* (2006.01)
*H04L 12/56* (2006.01)

(52) U.S. Cl. ...................... 370/255; 370/390

(58) Field of Classification Search .............. 370/254, 370/255, 389, 390
See application file for complete search history.

(56) References Cited

U.S. PATENT DOCUMENTS
6,788,692 B1 * 9/2004 Boudreau et al. ............ 370/400

OTHER PUBLICATIONS

Kolam, Hairharan et al., "Implementation of offline-restart flavor of dependency in High Availability Clusters," Research Disclosure Journal, Nov. 2006, 7 pgs, Kenneth Mason Publications Ltd., Wesbourne, Hants UK.
Abdelaziz, Mohamed, Blog, "Shoal Dynamic Clustering" http://weblogs.java.net/blog/hamada/archive/2006/11/index.html, Aug. 2005, 2 pages (accessed Aug. 17, 2007).
JXTA Community Project, https://jxta.dev.java.net, 3 pages (accessed Aug. 17, 2007).
JXTA, from Wikipedia, the free encyclopedia, http://en.wikipedia.org/wiki/Jxta, 4 pages (accessed Aug. 17, 2007).
Traversat, Bernard et al., "Project JXTA 2.0 Super-Peer Virtual Network," Project JXTA, Sun Microsystems, Inc., 20 pages, May 25, 2003.

* cited by examiner

*Primary Examiner* — Ronald Abelson
(74) *Attorney, Agent, or Firm* — Osha • Liang LLP (57) ABSTRACT

A method, apparatus, and system are directed toward overlaying a cluster of nodes over peers in a peer-to-peer network using a peer identification and communication mechanism. A string based name for a resource in a peer-to-peer network is received and is used to generate a unique identifier using a secure hash algorithm. An advertisement specifying at least one address associated with the resource is associated with the unique identifier. The advertisement is broadcasted. The unique identifier and/or the resource in the peer-to-peer network is associated with a resource in the cluster. A network packet may be addressed to the resource in the cluster by the unique identifier. The network packet may be routed to the address associated with the resource in the cluster using an Open System Interconnection (OSI) Level 2 or above protocol.

18 Claims, 7 Drawing Sheets

METHOD AND APPARATUS FOR ENCODING AND MAPPING OF VIRTUAL ADDRESSES FOR CLUSTERS

TECHNICAL FIELD

The present invention relates generally to network communications, and more particularly, but not exclusively, to managing identification of nodes in a cluster.

BACKGROUND

Clustering of computer systems is becoming an increasingly popular way for enterprises and large businesses to ensure greater availability to multiple users. Different types of clusters have evolved, including high availability clusters, high performance clusters, load balanced clusters, and the like. Example of clustering systems include the Veritas™ Cluster Server, HP™ Serviceguard, and/or Microsoft™ Cluster Server.

Clusters are a class of coupled distributed systems that provide high availability for applications typically by using hardware redundancy to recover from single points of failure. Clusters typically include multiple nodes that interact with each other to provide users with various applications and system resources and may appear to the user as a single entity. Each node typically runs a local operating system kernel.

In the event of a hardware or software failure, the cluster automatically restarts applications on the same node or "fails over" (e.g., restarts applications on a different node) the applications in order to keep applications available to clients of the cluster. Conventionally, the cluster software is responsible for managing the identification of the nodes of the cluster, the starting/restarting applications on one or more nodes of the cluster, or the like.

While clusters provide high performance and availability, their management may be complex, and they may be tied to a specific communication infrastructure. Moreover, clusters may not be able to interoperate because they may use different communication infrastructures, for example. It is with respect to this consideration and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The invention now will be described more fully hereinafter with reference to the accompanying drawings, which form a part hereof, and which show, by way of illustration, specific exemplary embodiments by which the invention might be practiced. This invention might, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention might be embodied as methods or devices. Accordingly, the invention might take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it might. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection might be a TCP connection. TCP connections are logical connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication.

The term "node" refers to a computing element that is one logical part of a network. A node might be a virtual operating environment or virtual machine. Examples of virtual cluster nodes include Solaris™ containers or zones, IBM™ virtual machines, Solaris™ Logical Domains (LDOMs), Xen™ domains, VMware™ "virtual machines" or the like. In one embodiment, a node might be connected to other nodes within a network. A node might be a physical device (i.e., a physical node), such as a computer, or the like, or a virtual operating environment running on a physical device (i.e., a virtual node).

A Peer-to-Peer (P2P) network refers to a network loosely connected devices configured to distribute processing and/or storage resources across networks. These networks include ad-hoc networks, heterogeneous networks, or the like. As used herein, the term "peer" refers to a network device or service within a peer-to-peer system. Peers may include peers in Centralized P2P network such as Napster, Decentralized P2P network such as KaZaA, Structured P2P network such as Content Addressable Network (CAN), unstructured P2P network such as Gnutella, hybrid P2P network (centralized and/or decentralized) such as JXTA, or the like.

JXTA (Juxtapose) is P2P standard described in more detail in "JXTA in a Nutshell" by Scott Oaks, Bernard Traversat, Li Gong, September 2002, O'Reilly Press, September 2002, which is incorporated herein by reference. JXTA utilizes a set of XML based protocols that allow a network device to exchange messages and collaborate. JXTA enables a range of devices (e.g., PCs, mainframes, cell phones, PDAs) to communicate in a decentralized manner. JXTA may be implemented as bindings in a variety of computer languages, including JAVA, C/C++, or the like.

A JXTA system maps a peer to a device in a network. Thus, JXTA networks of peers create a virtual overlay network that allows a peer to interact with other peers directly even when some of the peers are behind firewalls, NATs, use different network transports, or the like. A JXTA system uses, among other things, an exchange of one or more advertisements between the peers to enable communication between the peers.

As used herein, the term "peer group" refers to a collection of peers that are enabled to communicate with each other. A peer group also provides a scope for message propagation within the peer group. That is, a message sent within a peer group is directed to every peer in the peer group. In a JXTA system, every peer is a member of a default group, but may be a member of many other sub-groups.

As used herein, the term "advertisement" refers to any document that includes data that describes any resource (e.g., peer) in a P2P network. An advertisement may comprise a markup language document such as an XML document, or virtually any data configured to be read and parsed for information. An advertisement may be associated with a unique identifier (ID) that identifies the resource. The advertisement may include characteristics of the identified resource, including hardware and/or software configurations, CPU load, provided communication protocols, preferred communication protocols (e.g., under which resources/peers may communicate with each other), or the like. Examples of the use of advertisements, especially within the context of P2P networks are described in more detail in U.S. Pat. No. 7,065,579, "System using peer discovery and peer membership protocols for accessing peer-to-peer platform resources on a network" to Traversat, et al., which is incorporated herein by reference.

As used herein, the terms "peer-to-peer (P2P) resource" or "resource in a P2P network" refers to any service, device, or the like in communication with each other within a peer-to-peer network. The terms "cluster resource" or "resource in a cluster" refers to a node of the cluster, a service provided by a node in the cluster, or the cluster itself (e.g., every node in the cluster).

Briefly stated, the present invention is directed towards overlaying a cluster of nodes onto peers in a P2P network using a peer identification and communication mechanism. A string based name for a resource in a P2P network is received and is used to generate a unique identifier using a secure hash algorithm. An advertisement specifying at least one address associated with the resource is associated with the unique identifier. The advertisement is broadcast to at least one peer in the P2P. The unique identifier and/or the resource in the P2P network is associated with a resource in the cluster. Subsequently, the resource in the cluster may be identified by the unique identifier. For example, a network packet may be addressed to the resource in the cluster by the unique identifier. The network packet may be routed to the address associated with the resource in the cluster using an Open System Interconnection (OSI) Level 2 protocol or above. In one embodiment, the advertisement may specify the OSI Level 2 or above protocol available for resource. In one embodiment, the advertisement may specify a cluster of nodes. In this embodiment, the network packet addressed to the unique identifier for the advertisement is sent to every node in the cluster.

Some benefits of the present invention include providing a foundation for network configuration and dynamic and autonomous cluster formation, providing dynamic network configuration that support seamless discovery and cluster formation to uniquely identify and virtualize a node, cluster, application, or communication channel, providing access to current or legacy cluster topologies, providing a flexible schema that allows definition of and access to node configuration, or the like.

Illustrative Operating Environment

Figure 1A:
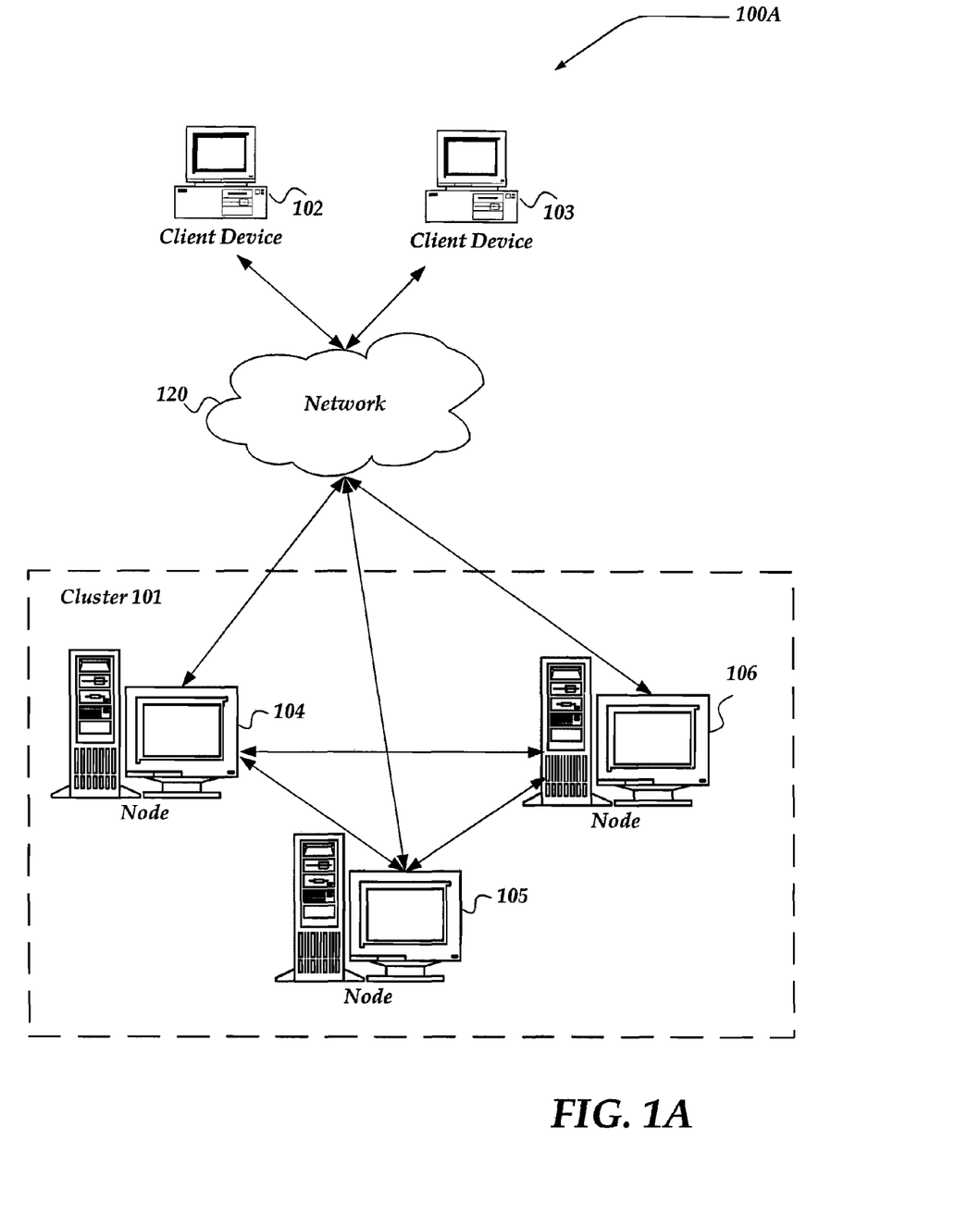
FIGS. 1A-1B show block diagrams illustrating two embodiments of environments for practicing the invention.
Figure 1B:
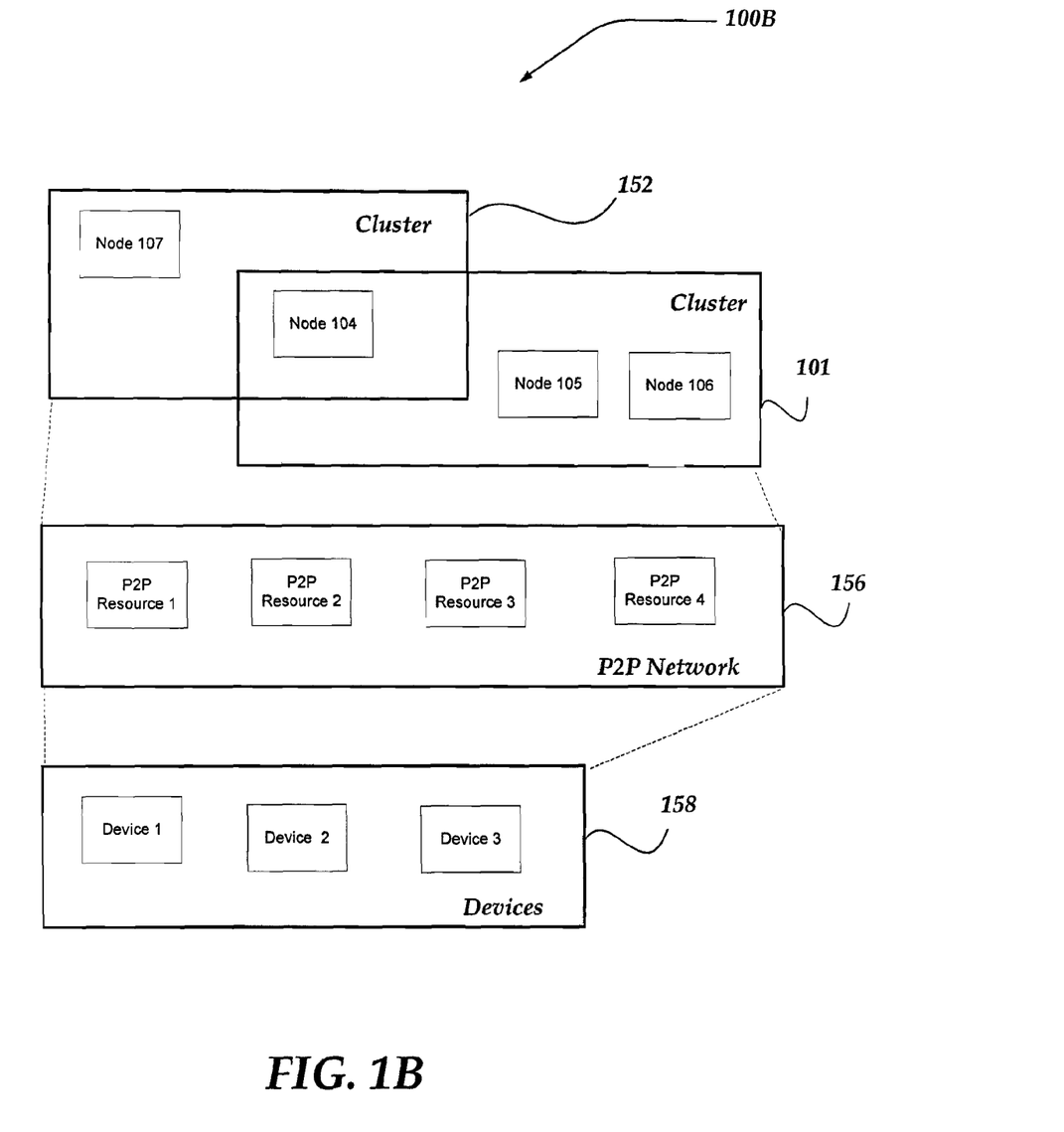

FIGS. 1A-1B show block diagrams illustrating two embodiments of environments for practicing the invention. However, not all of these components might be required to practice the invention, and variations in the arrangement and type of the components might be made without departing from the spirit or scope of the invention. As shown in the figure, system 100A of FIG. 1A includes client devices 102-103, network 120, and nodes 104-106. As shown, nodes 104-106 participate in cluster 101. In one embodiment, cluster 101 might be a high availability (HA) cluster, a high performance cluster, a load balanced cluster, or the like.

Generally, client devices 102-103 might include virtually any computing device capable of connecting to another computing device to send and receive information, including web requests for information from a server device, or the like. The set of such devices might include devices that typically connect using a wired communications medium such as personal computers, multiprocessor systems, microprocessor-based or programmable consumer electronics, network PCs, or the like. The set of such devices might also include devices that typically connect using a wireless communications medium such as cell phones, smart phones, radio frequency (RF) devices, infrared (IR) devices, integrated devices combining one or more of the preceding devices, or virtually any mobile device. Similarly, client devices 102-103 might be any device that is capable of connecting using a wired or wireless communication medium such as a PDA, POCKET PC, wearable computer, or any other device that is equipped to communicate over a wired and/or wireless communication medium.

Client devices 102-103 might further include a client application that is configured to manage various actions. Moreover, client devices 102-103 might also include a web browser application that is configured to enable an end-user to interact with other devices and applications over network 120.

Client devices 102-103 might communicate with network 120 employing a variety of network interfaces and associated communication protocols. Client devices 102-103 might, for example, use various dial-up mechanisms with a Serial Line IP (SLIP) protocol, Point-to-Point Protocol (PPP), any of a variety of Local Area Networks (LAN) including Ethernet, AppleTalk™, WiFi, Airport™, or the like. As such, client devices 102-103 might transfer data at a low transfer rate, with potentially high latencies. For example, client devices 102-103 might transfer data at about 14.4 to about 46 kbps, or potentially more. In another embodiment, client devices 102-103 might employ a higher-speed cable, Digital Subscriber Line (DSL) modem, Integrated Services Digital Network (ISDN) interface, ISDN terminal adapter, or the like.

Network 120 is configured to couple client devices 102-103, with other network devices, such as nodes 104-106, or the like. Network 120 is enabled to employ any form of computer readable media for communicating information from one electronic device to another. In one embodiment, network 120 might include the Internet, and might include local area networks (LANs), wide area networks (WANs), direct connections, such as through a universal serial bus (USB) port, other forms of computer-readable media, or any combination thereof. On an interconnected set of LANs, including those based on differing architectures and protocols, a router might act as a link between LANs, to enable messages to be sent from one to another. Also, communication links within LANs typically include twisted wire pair or coaxial cable, while communication links between networks might utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 120 might further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks might enable wide area coverage for network devices, such as client devices 102-103, or the like, with various degrees of mobility. For example, network 120 might enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 120 includes any communication method by which information might travel between one network device and another network device.

Additionally, network 120 might include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, or other wired media and wireless media such as, but not limited to, acoustic, RF, infrared, or other wireless media.

One embodiment of a network device that could be used as nodes 104-106 is described in more detail below in conjunction with FIG. 3. Briefly, however, nodes 104-106 might include any computing device capable of communicating packets to another network device. Each packet might convey a piece of information. A packet might be sent for handshaking, i.e., to establish a connection or to acknowledge receipt of data. The packet might include information such as a request, a response, or the like. Generally, packets received by nodes 104-106 might be formatted according to TCP/IP, but they could also be formatted using another transport protocol, such as SCTP, UDP, NetBEUI, IPX/SPX, token ring, similar IPv4/6 protocols, or the like. Moreover, the packets might be communicated between nodes 104-106 and client devices 102-103 employing HTTP, HTTPS, Real-Time Streaming Protocol (RTSP), or any of a variety of current or later developed protocols.

In one embodiment, nodes 104-106 might be configured to operate as a website server. However, nodes 104-106 are not limited to web server devices, and might also operate a messaging server, a File Transfer Protocol (FTP) server, a database server, content server, or the like. Additionally, each of nodes 104-106 might be configured to perform a different operation.

Devices that might operate as nodes 104-106 include personal computers, desktop computers, multiprocessor systems, microprocessor-based or programmable consumer electronics, network PCs, server devices, or the like.

As shown, cluster 101 includes nodes 104-106. Cluster 101 is a collection of devices that operate together to provide various services. Cluster 101 may operate as any of a variety of clusters, including a high availability cluster, a high performance cluster, a load balanced cluster, and the like.

As shown, nodes 104-106 might communicate with each other. At least one of nodes 104-106 may be a master node. The master node may provide, among other things, cluster leadership and/or cluster state management of cluster 101. For example, in one embodiment, the master node may determine which nodes may or may not be a member of the cluster. The master node may also manage providing one of cluster 101's services to client devices 102-103 as if the service was provided from a single entity. The master node may be determined, elected, or otherwise defined by a variety of cluster management algorithms known in the art. Any clustering algorithm may also enable provisioning of a cluster service for cluster 101.

In one embodiment, nodes 104-106 of cluster 101 may be an overlay on peers within a peer-to-peer (P2P) network, in accordance with the present invention. In one embodiment, the P2P network may be enabled by any P2P algorithm, scheme, mechanism, or the like. In one embodiment, the P2P scheme may be JXTA.

In one embodiment, devices may be determined or assigned as peers in a P2P network. For example, a device may join a peer group. At least one subset of peers (or even all peers) may be mapped or otherwise associated with a resource in a cluster. In one embodiment, a first peer may be determined to be a master node in a cluster. A subsequent peer may be registered, or may register itself with the master node, other nodes, and/or resources in the cluster. If the registration is successful, the subsequent peer may be mapped to a resource in the cluster. In one embodiment, the resource in the cluster may be a node. In another embodiment, the resource in the cluster may be a group of nodes, a service provided by a node, or the like. In any case, the subsequent peer may participate in the cluster. Thus, a cluster may be overlaid over a network of peers in a P2P network. For example, a peer mapped or overlaid to node 104 may provide a service for the cluster 101 to client devices 102-103. Referring briefly to FIG. 1B, cluster 101 includes nodes 104-106. Cluster 101 is overlaid on P2P network 156. For example node 104 may be mapped to P2P resource 2, node 105 may be mapped to P2P resource 3, and node 106 may be mapped to P2P resource 4. Also shown is cluster 152 which includes a node 104 common to cluster 101. In general, a peer may be mapped onto a plurality of cluster nodes for a plurality of clusters.

As shown, P2P network 156 may be any P2P network, including a JXTA enabled P2P network. In one embodiment, the overlaid clusters 101 and 156 may utilize a peer group management and/or communication mechanism of P2P network 156. In one embodiment, a P2P network may define a plurality of possibly overlapping peer groups. For example, P2P resources 1-3 may be in a first peer group, and P2P resources 2-4 may be in second peer group. Communications between peers in peer groups may be restricted, such that peers not in the peer group are not privy to the communication. In one embodiment, a cluster may be overlaid onto the peers of the peer group (e.g., cluster 152 overlaid on first peer group and cluster 101 overlaid on second peer group), thus enabling secure or otherwise restricted communication within the cluster.

In one embodiment, P2P network 156 may have an optimized routing mechanism that allows an efficient propagation of messages across a plurality of devices, such as device 1-3 of device set 158 and/or across a plurality of networks (e.g., network 120). This may be achieved through the use of a loosely consistent network, through the use of rendezvous networks, edge peers, super-peers, relay peers, or the like. In this embodiment, the overlaid clusters 101 and 156 may also be enabled to communicate across networks, or the like. As shown, the P2P resources 1-4 (e.g., peers) of P2P network 156 may be mapped onto a plurality of devices 1-3. In one embodiment, a plurality P2P resource may be mapped onto the same device or services provided by the same device. For example, P2P resource 2 may be mapped to a first service (e.g., disk service) on device 2, while P2P resource 3 may be mapped to a second service (e.g., web service) on device 2.

In one embodiment, P2P network 156 may be enabled by the JXTA algorithm(s), communication mechanism, interface standards, and the like. For example, in one embodiment, P2P network 156 may use a P2P resource identification process, such as the one provided by JXTA. In one embodiment, a unique ID for a peer may be generated by any hash algorithm, including a SHA-1 (e.g., 160 bit) algorithm, MD5. RACE Integrity Primitives Evaluation Message Digest (RIPMED), or the like. The unique ID may be a Uniformed Resource Name (URN), or the like. The unique ID may be used to identify the peer and/or any cluster resources overlaid on the peer.

Figure 5:
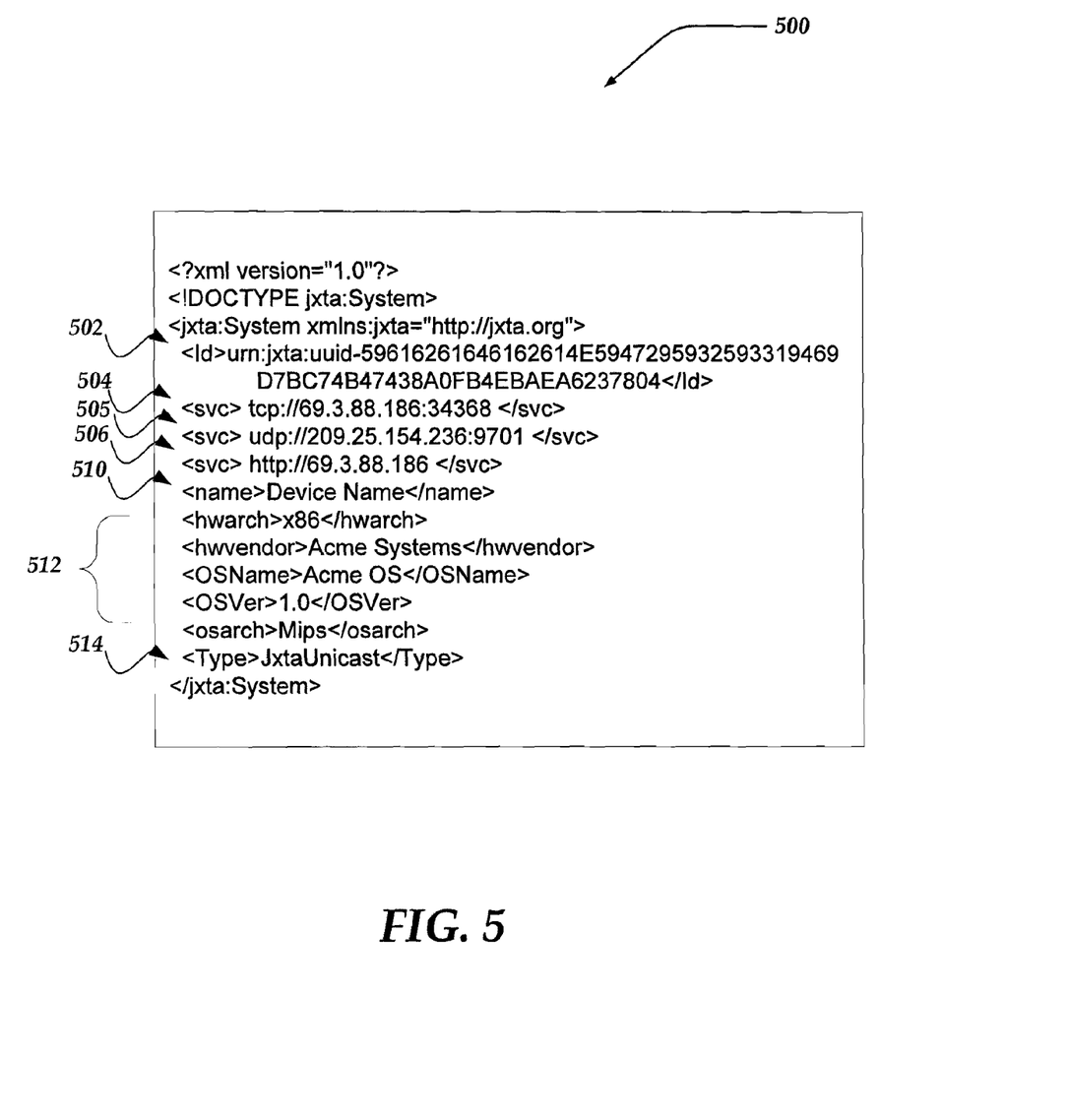
FIG. 5 illustrates an example of an advertisement associated with a resource in a cluster.

P2P network 156 may also provide an advertisement mechanism for communicating using the underling addresses (e.g., IP) associated with a peer. In one embodiment, an advertisement may be associated with the unique ID. Referring to FIG. 5, the advertisement may be advertisement 500, identified by ID 502. In one embodiment, the advertisement may be published to the resources in the clusters (e.g., the overlaid peers) by a variety of mechanisms, including broadcasting, multicasting, indexing, a JXTA publication mechanism, or the like. Briefly, publication of an advertisement for a peer may comprise sending the advertisement to at least one other peer. In one embodiment, the publication may include using JXTA's distributed indexing system (e.g., Shared Resource Distributed Index (SRDI)), using a distributed hash table (DHT) function, sending at least a portion of the advertisement to at least one peer, a set of peers (e.g., neighbors to a rendezvous peer), or the like.

The advertisement may be looked up (e.g., on node 104-106) by the unique ID using a variety of mechanisms. For example, the lookup process may use of the DHT function to discover a peer (s) that stores the index, which includes the association between the unique ID/advertisement. A request for the advertisement may be sent to the discovered peer. The discovered peer may retrieve the advertisement in its lookup table, index, associations, or the like, and may return the looked up advertisement. In one embodiment, the discovered peer may even forward the request to another peer for providing the advertisement.

In one embodiment, if the DHT function does not return a discovered peer and/or the discovered peer does not provide the advertisement, then a variety of other mechanisms may be used to retrieve the advertisement. In one embodiment, a multi-cast discovery message may be sent to all peers within a peer group (e.g., all nodes in the cluster), using for example, a filtering mechanism and/or based on the peer group's unique ID. At least one peer may respond with the advertisement. In one embodiment, the advertisement may be cached by the requesting peer for future look ups.

Referring back to FIG. 1A, in one embodiment, one of client devices 102-103 may request a service from cluster 101. The request may be sent through network 120 to a master node (e.g., node 104). The master node 104 may determine a node in the cluster 101 that provides the service. Master node 104 may determine for example that node 106 may provide the service, but may determine that node 106 has failed over, such that the service now resides on node 105. Accordingly, master node 104 may request the advertisement associated with a unique ID for node 105. In one embodiment, master node 104 may request the advertisement using an underlying P2P naming mechanism. Master node 104 may parse the advertisement or otherwise retrieve an address of the node 105 and/or the requested service on node 105. Master node 104 may provide this service to client devices 102-103 using a variety of mechanisms, including forwarding the request to the address on node 105, requesting the service on behalf client devices 102-103, providing a tunnel between client devices 102-103 to node 105, caching a result of the service, or the like.

In one embodiment, the advertisement may specify a cluster of nodes. In this embodiment, the network packet addressed to the unique identifier for the advertisement is sent to every node in the cluster. For example, the request may be restricted to nodes within cluster 101. For example, the request may be multi-casted to a peer group that is overlaid by nodes within cluster 101. In any case, the service is provided to client devices 102-103 from cluster 101 as if the service was provided by a single entity (e.g., client devices 102-103 are not provided the identity of the node providing the service).

Figure 2A:
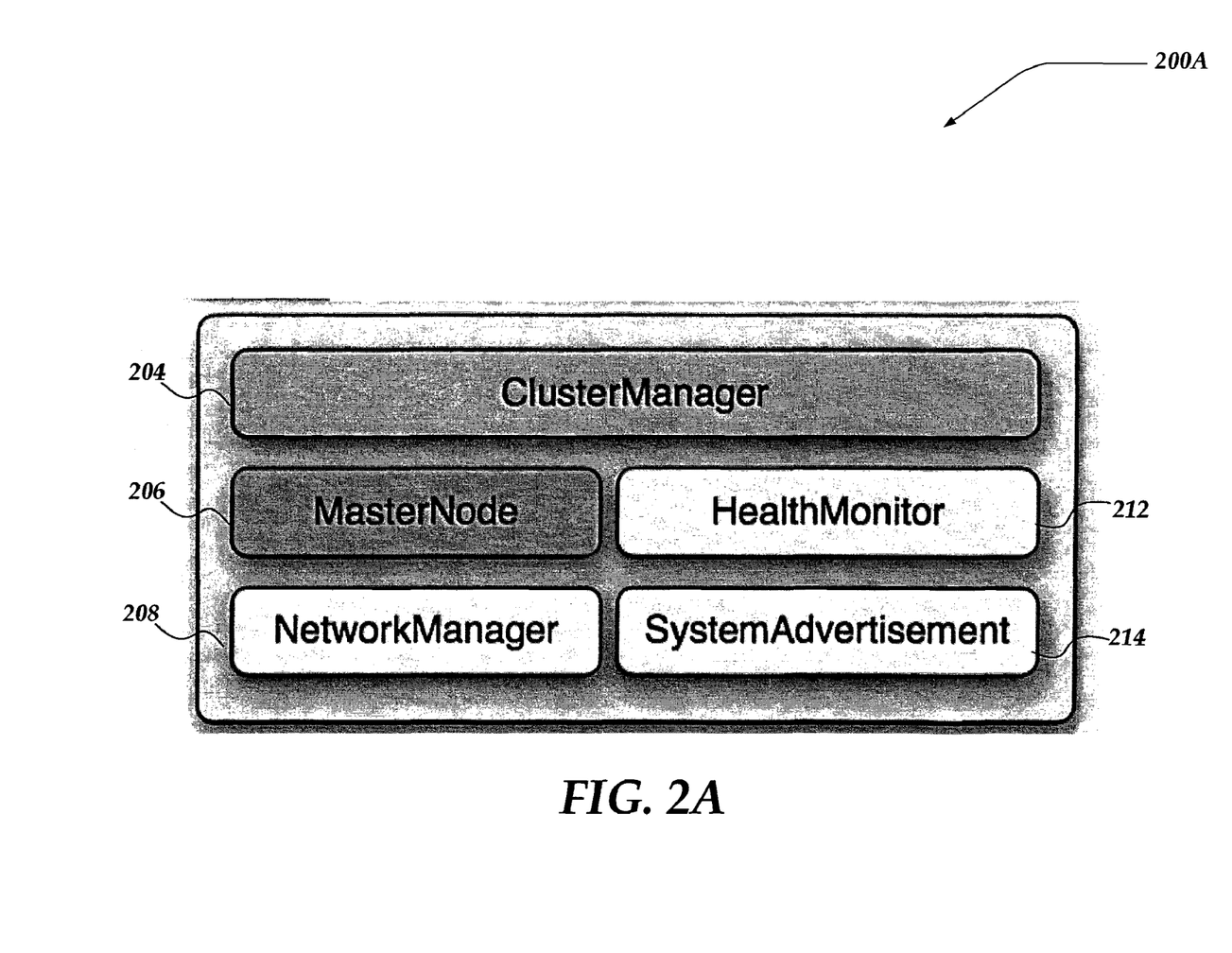
FIGS. 2A-2B illustrate examples of two embodiments of components for managing a cluster using a P2P/cluster overlay.
Figure 2B:
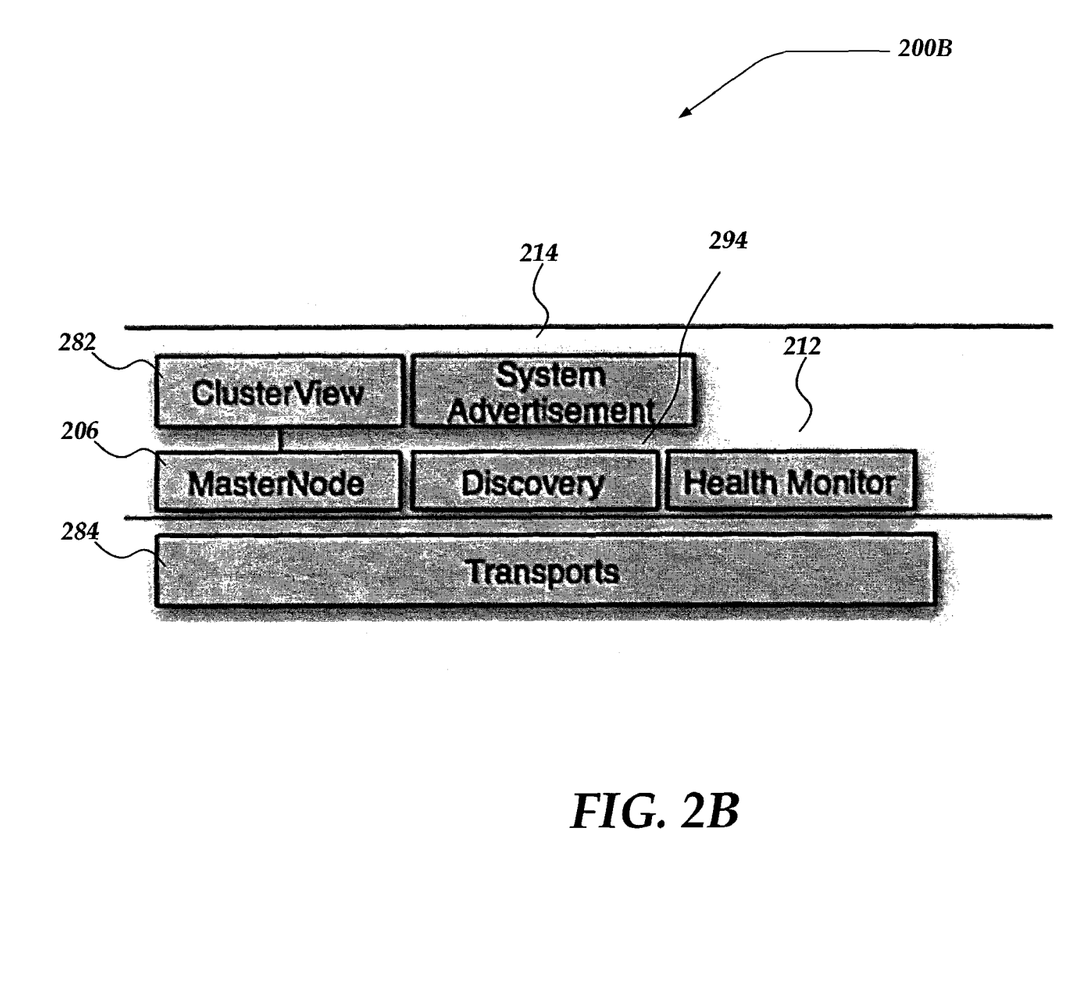

FIGS. 2A-2B illustrate examples of two embodiments of components for managing a cluster using a P2P/cluster overlay. Components of systems 200A and/or 200B may be included in a network device, such as network device 300 of FIG. 3, may be embodied in separate software and/or hardware components, or the like. As shown, components of systems 200A and 200B may interoperate to support dynamic cluster formation, monitoring, and autonomous recovery. Systems 200A and 200B might also include other components to provide additional cluster management and group communication services, or the like, without departing from the scope of the invention.

Cluster Manager 204 includes any component for defining, creating and/or managing the cluster, managing and/or monitoring fail-overs, waiting for node closure, stopping services when required, providing interfaces to services provided by a node, or the like. In one embodiment, every node in the cluster may include an instance of Cluster Manager 204. In one embodiment, a plurality of instances of Cluster Manager 204 may cooperate to manage the cluster.

In one embodiment, Cluster Manager 204 may, upon startup, receive a logical member name of the node associated with Cluster Manager 204. The logical member name may be a string based name, may represent the name of that is a constant identity for the node across several lifecycles (e.g., starting and stopping), or the like. In one embodiment, Cluster Manager 204 may also use the logical member name and/or other received parameter to create a self-signed node certificate to authenticate or otherwise verify the identity of the node. Cluster manager 204 may also receive other properties of the node, including application configurable parameters such as specific interface addresses, port numbers, failure detection timeouts, or the like. Cluster Manager 204 may provide this information to other components in order to, for example, create an advertisement for the associated node.

Cluster View 282 includes any component for providing a view or snapshot of the membership of nodes in a cluster. In one embodiment, Cluster View 204 may maintain an ordered list of all nodes in the cluster (e.g., based on their unique ID and/or advertisement), may provide an identity of a master node of the cluster, may provide mechanisms for marking a member of the cluster as the master node, or the like. In one embodiment, Cluster View 282 may push changes to the membership of the cluster to other components (e.g., other components in other nodes that have registered a change notification event listener).

Master Node 206 includes any component for managing group leadership and/or group state management of a cluster. In one embodiment, a plurality of nodes in a cluster may include an instance of Master Node 208. In one embodiment, at startup of a node by Cluster Manager 204, the associated Master Node 206 may determine whether the node is a master node and/or which node in the cluster is already a master. This determination may be performed by any master node discovery and/or determination algorithm, including broadcasting a request for an identity of a master node, broadcasting a vote for a master node, an election scheme, or the like. In one embodiment, the election scheme may be a protocol that is resilient to multi-node collisions and/or may employ an autonomous mechanism to avoid network chatter to resolve collisions. In any case, if the associated node is determined as the master, Master Node 206 may then manage cluster view changes to the group, e.g., when a new member is discovered or an existing member has either shutdown gracefully or abnormally terminated (failed), or the like.

System Advertisement 210 includes any component for storing and/or maintaining at least one advertisement associated with a peer and/or node, or even a cluster. In one embodiment, the advertisement may identify a service provided by a peer/node, the peer/node itself, or even a cluster of nodes. In one embodiment, an advertisement associated the cluster provided by Cluster View 282 may be included in System Advertisement 210. Advertisements substantially similar to advertisement 500 of FIG. 5 may be included in System Advertisement 210, for example. In one embodiment, System Advertisement 210 may be a cache of advertisements associated with a plurality of unique IDs. In one embodiment, a cached advertisement may be marked as outdated and/or may be cleared from the cache based on a time-to-live parameter.

Network Manager 208 includes any component for providing automatic configuration and/or naming of nodes in a cluster. In one embodiment, Network Manager 208 may provide an interface to an underlying P2P service, may configure various aspects of the P2P service, or the like. In one embodiment, Network Manager 208 may provide an interface to a JXTA service. Network Manager 208 interfaces may build JXTA's PlatformConfig document, and may provide this core communications manifest to the JXTA service.

In one embodiment, Network Manager 208 may create a unique ID based on a string based name, may create an associated advertisement, or the like. In one embodiment, Network Manager 208 may send a string based name to the P2P service to generate a unique ID. In another embodiment, Network Manager 208 may use an algorithm substantially similar to the unique ID generator of the P2P service (e.g., an SHA-1 secured hash algorithm), or the like.

In one embodiment, given an instance and cluster name for a node, Network Manager 208 may use a SHA-1 hash to generate a Cluster ID, and Node ID. In another embodiment, the cluster name may not be known, and thus only the Node ID may be generated. In addition, Network Manager 208 may also define a set of predefined communication unique IDs for a node, which may be used for formation, monitoring, messaging, or the like. Network Manager 208 may also receive additional configuration parameters, such as bootstrapping addresses to facilitate cross sub-net and firewall communication, or the like. These predefined communication unique IDs and/or parameters may also be encoded and/or may be associated with the Node ID and/or Cluster ID in an advertisement. In any case, Network Manager 208 may provide the created information to System Advertisement 210 for storage and/or further processing.

Discovery Component 294 includes any component for providing discovery of the existence, identity, and/or advertisement of nodes in a cluster. In one embodiment, Discovery Component 294 may interface with JXTA's DiscoveryService and/or may receive notification of node discovery, advertisement discovery, or the like. In one embodiment, Discovery Component 294 may publish a node's advertisement using a DHT function, multi-casting, or the like. Discovery Component 294 may also receive a unique ID, and may return an advertisement associated with the unique ID. Discovery Component 294 may use a variety of mechanisms, including caching, discovery requests, or the like to provide the associated advertisement. Discovery Component 294 may provide discovered advertisements to System Advertisement 214 (e.g., for caching). If Discovery Component 294 discovers that a node associated with an advertisement has failed or shutdown, then Discovery Component 294 may remove the advertisement from System Advertisement 214. In one embodiment, Discovery Component 294 may publish discovered advertisements and/or changes to the status of advertisements (e.g., outdated, or invalid) to at least one peer in a peer group and/or one node in a cluster of nodes. In one embodiment, Discovery Component 294 interfaces with a P2P naming and communication mechanisms to manage advertisements.

While Discovery component 294 handles the planned entrance and planned exit of member nodes from a cluster, Health Monitor 212 manages abnormal termination or unavailability of members. In one embodiment, Health Monitor 212 may monitor the cluster's members and/or may determine whether the members have become unresponsive. In one embodiment, if a member node becomes unresponsive, Discovery component 294 may enable removing the member node from a cluster view, elect a new master node, or the like.

As shown, Cluster View 282, System Advertisement 214, Master Node 206, Discovery Component 294, Health Monitor 212 and/or other components of System 200A and 200B may communicate using a plurality of Transports Mechanism 284, including UDP, TCP/IP, HTTP, RTSP, application defined protocols, or the like.

Illustrative Network Device

Figure 3:
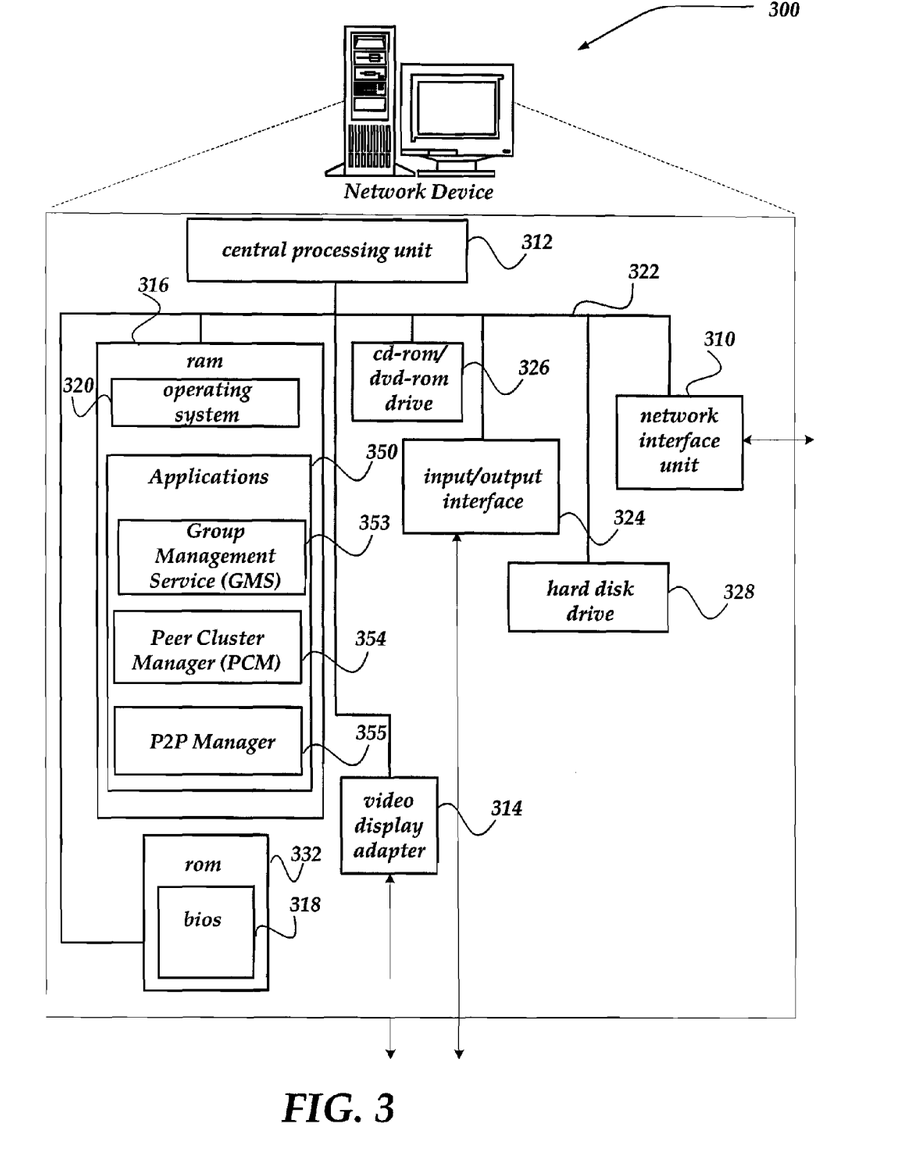
FIG. 3 illustrates one embodiment of a network device for managing identification of nodes in a cluster.

FIG. 3 shows one embodiment of a network device, according to one embodiment of the invention. Network device 300 might include many more or less components than those shown. The components shown, however, are sufficient to disclose an illustrative embodiment for practicing one or more embodiments of the invention. Network device 300 might represent, for example, nodes 104-106 of FIG. 1 and may include components of FIGS. 2A-2B.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Network device 300 also includes applications 350, which might be expressed as one or more executable instructions stored at one or more locations within RAM 316, although the instructions could be stored elsewhere.

As illustrated in FIG. 3, network device 300 also can communicate with the Internet, or some other communications network via network interface unit 310, which is constructed for use with various communication protocols including the TCP/IP protocol. Network interface unit 310 is sometimes known as a transceiver, transceiving device, or network interface card (NIC).

The mass memory 316, 326, 328, 332 described herein and shown in FIG. 3 illustrates another type of computer-readable media, namely computer storage media. Computer storage media might include volatile, nonvolatile, removable, and non-removable media implemented in any method or technology for storage of information, such as computer readable instructions, data structures, program modules, or other data, which might be obtained and/or executed by CPU 312 to perform one or more portions of processes 400 and 500 shown in FIGS. 4 and 5, respectively, for example. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory might also store other types of program code and data as applications 350, which might be are loaded into mass memory and run on operating system 320. Examples of application 350 might include email client/server programs, routing programs, schedulers, calendars, database programs, word processing programs, HTTP programs, RTSP programs, traffic management programs, security programs, and any other type of application program.

Network device 300 might also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application might initiate communication with an external application in a secure fashion. Moreover, network device 300 might further include applications that support virtually any secure connection, including TLS, TTLS, EAP, SSL, IPSec, or the like.

Network device 300 might also include input/output interface 324 for communicating with external devices, such as a mouse, keyboard, scanner, or other input/output devices not shown in FIG. 3. Likewise, network device 300 might further include additional mass storage facilities such as CD-ROM/DVD-ROM drive 326 and hard disk drive 328. Hard disk drive 328 might be utilized to store, among other things, application programs, databases, or the like in the same manner as the other mass memory components described above.

Group Management System (GMS) 353 enables an application to dynamically become a member node of a cluster, and to provide and/or subscribe to cluster events. Such cluster events include: member join, planned shutdown, failures, recovery member selection, automated delegated recovery initiation, or the like. If a cluster event is received or otherwise detected, a cluster event is created with the detail(s) of the event (including type, unique ID of nodes, or the like), and the event may be forwarded to a component subscribing to the cluster event. GMS 353 may also enable communicating data within at least one cluster over network interface 310, by, for example, forwarding messages between member nodes. In one embodiment, GMS 353 may enable broadcasting messages to an individual member or all members of the cluster, over network interface 310. In addition to messaging, member nodes may share data using a shared cache (e.g., a database (relational, object oriented, or the like), search engine, file, o the like), which may be managed by GMS 353, in one embodiment. In one embodiment, the shared cache may be stored in RAM 316, hard disk drive 328 and/or accessed over network interface 310, or the like. In one embodiment, GMS 353 may interface with a transport layer (e.g., transports 284 of FIG. 2), such as TCP/IP, UDP, HTTP, to enable communication between nodes in a cluster. In one embodiment, GMS 353 may provide an interface to a legacy cluster system, such as a Veritas™ system, Solaris™ LDOM, or the like, for providing the cluster events.

Peer Cluster Manager (PCM) 354 includes any component configured to manage a cluster overlaid over a P2P network. In one embodiment, PCM 354 may subscribe to cluster events using GMS 353 and may perform cluster management if an event is received. In one embodiment, PCM 355 may comprise, for example, Cluster Manager 204, Master Node 206, Health Monitor 212, Network Manager 208, System Advertisement 214, Discovery Component 294 of system 200A and/or 200B of FIGS. 2A and 2B. In general, PCM 354 may determine the membership of the cluster, receive a string based name for a peer in a P2P network, associate the peer with at least a part of a resource in the cluster, receive an advertisement from a advertisement creation component (e.g., P2P manager 355), based on the string based name, may provide to GMS 353, the advertisement to broadcast to a node in the cluster, or the like.

P2P Manager 353 includes in any component configured to provide a P2P service. In one embodiment, P2P Manager 353 may generate a (unique) ID for a peer/node and/or an advertisement associated with the ID. In one embodiment, P2P manager 353 may provide the ID and/or advertisement to PCM 354 for further processing. In one embodiment, P2P Manager 353 may provide a JXTA service. Some benefits provided by P2P Manager 353 may include minimal configuration for cross sub-net and firewall connectivity, dynamic transport selection without application intervention (multicast vs. unicast), dynamic route repair (which in turn enables mobility, same name different physical addresses, automatic rerouting on/to available interfaces on multi-homed nodes), traffic scoping to cluster members, secure end-to-end channels, or the like.

Illustrative Advertisement

FIG. 5 illustrates an example of an advertisement associated with a resource in a cluster. As shown, advertisement 500 is an XML document, which includes, among other things, unique ID 502 which identifies advertisement 500. ID 502 is specified by field "id" and is a URN. Advertisement 500 defines the properties for the peer named by name 510. Name 510 may include any string based name specified by tag "name." In one embodiment, name 510 may be used to generate Id 502 using a secured has algorithm. Advertisement 500 also exposes the underlying addresses 504-506 associated with the peer/node using, for example, the "svc" tags. As shown, each of the service may be provided over an OSI level 2 or above protocol (e.g., LTDP, TCP/IP, HTTP, RTSP, FTP). A shown, address 504 provides a TCP/IP address, address 505 provides a UDP address, and address 506 provides an HTTP address. Advertisement 500 may also define the methodology for propagating messages 514 from peer 500. Other fields 512 may also define other properties for the peer, including operating system type, operating system version, CPU load, bandwidth load, hardware and/or software configuration, port numbers, failure detection timeouts, or the like. While shown as an XML document with the particular fields shown, advertisement 500 may comprise any other configuration of specification of properties, without departing from the scope of the invention.

Generalized Operation

Figure 4:
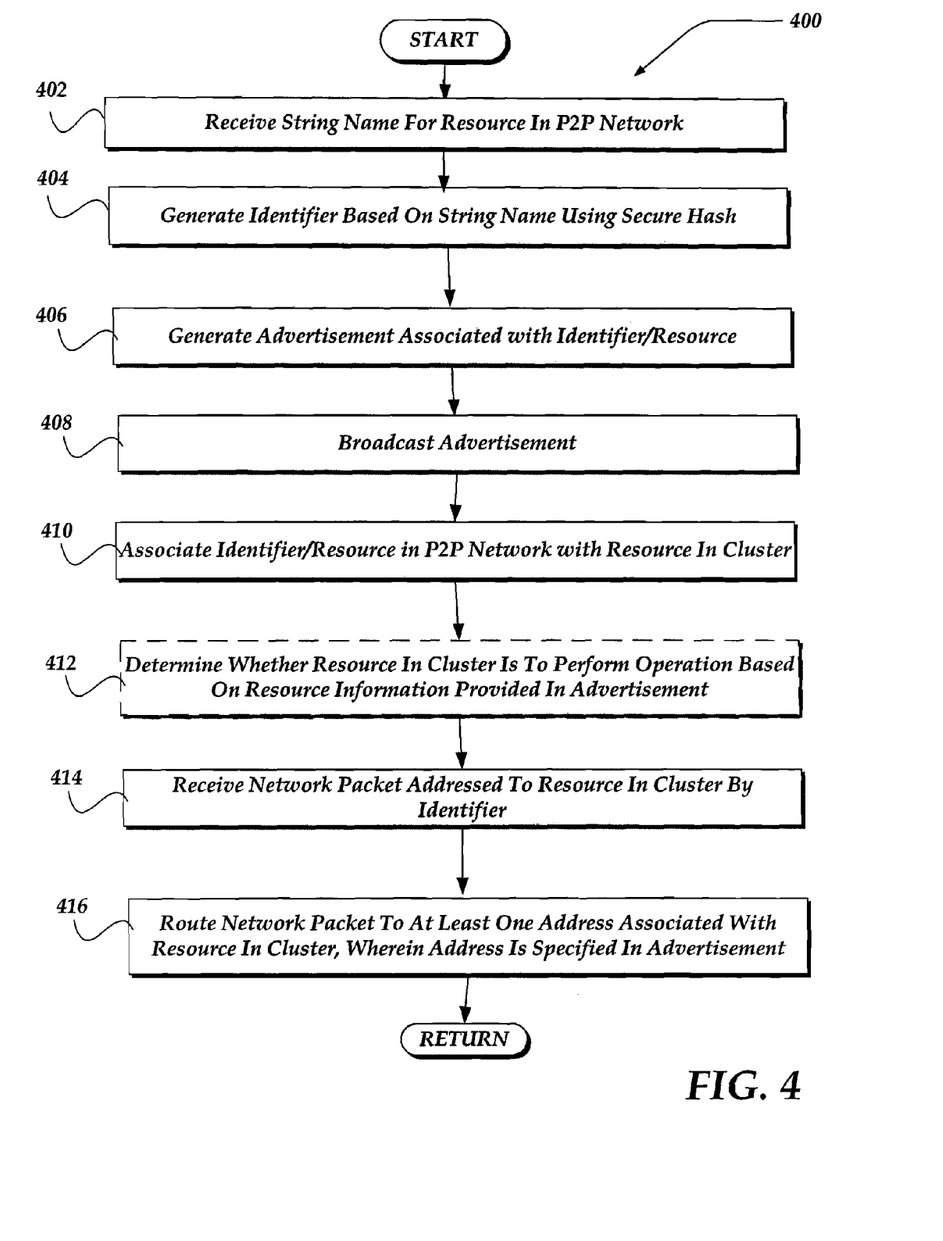
FIG. 4 illustrates a logical flow diagram generally showing one embodiment of a process for managing identification of nodes in a cluster.

The operation of certain aspects of the invention will now be described with respect to FIG. 4. FIG. 4 illustrates a logical flow diagram generally showing one embodiment of a process for managing identification of nodes in a cluster. Process 400 of FIG. 4 might be implemented, for example, within nodes 104-106 of FIG. 1.

At block 402, a string based name for a resource in a peer-to-peer (P2P) network is received. The string based named may be received from a plurality of sources, including through an API call, from a cluster management component, a peer management component, or the like. The string based name may identify a resource in a network, a cluster, a P2P network, peer group, or the like. In one embodiment, the string based name may be a concatenation of the name of the resource and/or the name of a cluster to which the resource belongs. Processing then continues to block 404.

At block 404, an identifier is generated based on the received string name using a secure hash algorithm. The secure hash may be an SHA-1 secure hash algorithm. In one embodiment, the identifier is a unique identifier. In one embodiment, the unique identifier may be a Uniformed Resource Name (URN), 160 bit block of data, a string representation of a number, or the like. Processing then continues to block 406.

At block 406, an advertisement associated with the identifier is generated. In one embodiment, the advertisement may be a markup language document. The advertisement may include a plurality of properties of the resource, including the name of the resource, at least one address associated with the resource, or the like. Referring briefly to FIG. 5, the "<svc>" tags may specify the at least one address using a plurality of OSI Level 2 or above protocols. As shown, address 504 provides a TCP/IP address, address 505 provides a UDP address, and address 506 provides an HTTP address. In one embodiment, the resource in the cluster is a cluster of nodes, and each of the at least one address are associated with at least one of the nodes. Processing then continues to block 406.

At block 408, an advertisement associated with the identifier is broadcast to at least one network device. In one embodiment, the advertisement is broadcasted to a peer in a peer-to-peer network, peer group, or the like. In one embodiment, the advertisement may be broadcast to at least one node in a cluster, to every node in the cluster, or the like. Processing then continues to block 410.

At block 410, the identifier and/or resource in the P2P network is associated with a resource in the cluster. The association between the resource in the P2P network and the resource in the cluster comprises an overlay of the cluster on the P2P network. In one embodiment, the cluster may be a high availability cluster, a load-balancing cluster, or a high performance cluster. In one embodiment, the resource in the P2P network may be a device. The device may be configured to participate in a cluster. For example, a component on the device may identify the device as a node (including a master node) in a cluster. The device may identify itself by using the identifier (e.g., Node ID and/or Cluster ID). In an alternate embodiment, block 408 may be performed before block 406 and/or block 404. In this embodiment, the device may generate and/or broadcast its advertisement after joining the cluster. Processing then continues to block 412.

At block 412, it is determined whether the resource in the cluster is to perform an operation based on information about the resource specified in the advertisement. In one embodiment, block 412 may be optional, and processing may instead continue to block 414. The node may be determined to perform the operation based on the capabilities and/or capacity of the node. In one embodiment, the operation may include performing a service provided by the cluster, replicating data, and/or virtually any other operation. In one embodiment, the capabilities, capacity, and/or load may include bandwidth load, CPU load, disk storage load, services available, or the like. Processing then continues to block 414.

At block 414, a network packet is received, wherein the network packet is addressed to the resource in the cluster by the identifier. The network packet may be received in a variety of ways and using a variety of mechanisms. In one embodiment, the determined operation from block 412 may initiate a request (e.g., by the master node) to the resource to perform the operation. In another embodiment, a request for a service or operation of the cluster may be received (e.g., intercepted by a master node). In one embodiment, the cluster service requested may comprise, for example, providing database operations, computation, web services, or the like. In one embodiment, the cluster operation requested may include a request to join the cluster, leave the cluster, or the like. The join request may include credentials of a requesting device and the identifier which specifies the cluster ID. The cluster ID may be used to route the request to the master node specified as the master node in an advertisement associated with the cluster ID. In any case, the request may comprise the network packet. The request may use an OSI level 2 or above protocol. Processing then continues to block 416.

At block 416, the network packet is routed to at least one address associated with the resource (node) in the cluster, wherein the at least one address is specified in the advertisement. In one embodiment, routing may comprise finding an advertisement indexed by the identifier, (optionally) parsing the advertisement for the at least one address, and sending the network packet to the at least one address over an Open System Interconnection (OSI) Level 2 or above protocol. In one embodiment, finding the advertisement may include searching for the advertisement, before routing, based on the other identifier and further based on a distributed hash table or function, a multi-cast request for the advertisement, or the like. In one embodiment, the string based name may identify the cluster itself. In this embodiment, routing may comprise identifying nodes in the cluster based on the advertisement, and restricting a recipient of the network packet based on whether the recipient is a node within the cluster. In one embodiment, this restricting may create a firewall between nodes in a cluster and devices outside the cluster. In one embodiment, the service may be provided by the resource (node) of the cluster based on the routed network packet. Processing then returns to calling process for further processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method for identifying resources in clusters over a network, comprising:
   receiving a string based name for a resource in a peer-to-peer (P2P) network;
   generating an identifier using a secure hash algorithm based on the string based name;
   generating an advertisement associated with the identifier;
   associating the identifier for the resource in the P2P network with a resource in a cluster, wherein the resource in the cluster is a cluster of nodes;
   broadcasting the advertisement to a node in the cluster, wherein the advertisement is useable in identifying at least one address associated with the resource in the cluster, wherein each of the at least one address is associated with at least one of the nodes; and
   determining whether the resource in the cluster is to perform an operation based on information about a capacity of the resource provided in the advertisement.

2. The method of claim 1, further comprising:
   receiving a network packet addressed to the resource in the cluster; and
   routing the network packet to the at least one address associated with the resource in the cluster, wherein the at least one address is specified in the advertisement.

3. The method of claim 2, wherein routing the network packet to the at least one address specified in the advertisement further comprises:
   finding the advertisement indexed by the identifier;
   parsing the advertisement for the at least one address; and
   sending the network packet to the at least one address over an Open System Interconnection (OSI) protocol.

4. The method of claim 2, wherein routing the network packet to the at least one address specified in the advertisement further comprises:
   identifying nodes in the cluster based on the advertisement; and
   restricting a recipient of the network packet based on whether the recipient is a node within the cluster.

5. The method of claim 1, further comprising:
   associating, at the node, the broadcasted advertisement with the identifier.

6. The method of claim 1, wherein the string based name comprises a name of a device and a name of a cluster to which the device belongs.

7. The method of claim 1, wherein the advertisement comprises a markup language document.

8. The method of claim 1, wherein the cluster is at least one of a high availability cluster, a load-balancing cluster, or a high performance cluster.

9. A system for identifying resources in clusters over a network, comprising:
   a peer cluster manager operable to perform actions comprising:
      receiving a string based name of a device;
      generating an identifier using a secure hash algorithm based on the string based name;
      associating the device with the cluster; and
      broadcasting an advertisement associated with the identifier;
   the cluster of devices comprising:
      a master device operable to manage the cluster;
      a first device operable to perform actions comprising:
         generating an advertisement associated with the identifier;
         providing the advertisement to the P2P manager for broadcasting; and
      a second device operable to perform actions comprising:
         receiving a network packet addressed to the first device by another identifier; and
         routing the network packet to the at least one address specified in the advertisement.

10. The system of claim 9, wherein the peer cluster manager is further operable to perform actions comprising:
    associating the device with another cluster;
    generating another unique identifier for the other cluster based on the secure hash algorithm; and
    broadcasting another advertisement associated with the other unique identifier, wherein the other advertisement is useable for restricting network traffic associated with the device to at least one cluster to which the device belongs.

11. The system of claim 9, wherein the second device is further operable to perform the actions comprising:
    finding the advertisement, before routing, based on the other identifier and further based on a distributed hash table ort a multi-cast request for the advertisement.

12. The system of claim 9, wherein the master device is further operable to perform actions comprising:
    determining which of the devices in the cluster to perform an operation based on resource information provided in the advertisement.

13. The system of claim 9, wherein at least one device in the cluster is identified in the advertisement by an address useable in at least one of a Radio Frequency (RF), Global System for Mobile Communications (GSM), or Internet Protocol (IP) protocol.

14. The system of claim 9, wherein the secure hash algorithm is an SHA-1 secure hash algorithm.

15. The system of claim 9, wherein routing the network packet to the at least one address specified in the advertisement further comprises:
    timing out on an attempt to send the network packet to the at least one address;
    sending a network address discovery request for another address of the device to another device in the cluster;

receiving a response to the network address discovery request;
caching the response; and
forwarding the network packet to the other address specified in the response.

16. A network device for identifying a resource in a cluster over a network, comprising:
a Group Management Service (GMS) for communicating data within at least one cluster over the network; and
a peer cluster manager in communication with the GMS, the manager operable to perform actions comprising:
determining the cluster with at least one master node;
receiving a string based name for a peer in a peer-to-peer (P2P) network;
associating the peer with at least part of the resource in the cluster;
receiving an advertisement from a P2P manager based on the string based name; and
providing to the GMS the advertisement to broadcast to a node in the determined cluster, wherein the advertisement is useable in identifying at least one address associated with the cluster; and
The P2P manager in communication with the peer cluster manager, the P2P manager operable to perform actions comprising:
generating a unique identifier for a peer in a P2P network using a secure hash algorithm; and
generating another advertisement associated with the unique identifier.

17. The network device of claim 16, wherein the resource is the network device or the determined cluster.

18. The network device of claim 16, wherein the peer cluster manager is further operable to perform actions comprising:
forwarding another version of the advertisement from the P2P manager to the GMS, wherein the other version of the advertisement comprises a different address for the resource than an address in the advertisement.

* * * * *